(12) United States Patent
Tanguay

(10) Patent No.: US 11,666,109 B1
(45) Date of Patent: Jun. 6, 2023

(54) CONVEYOR WITH CONFIGURABLE THREE-DIMENSIONAL TOPOGRAPHY

(71) Applicant: CreateMe Technologies LLC, New York, NY (US)

(72) Inventor: Michael William Tanguay, Camas, WA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/710,890

(22) Filed: Mar. 31, 2022

(51) Int. Cl.
*A41H 43/02* (2006.01)
*B65G 15/50* (2006.01)
*B65G 23/16* (2006.01)
*B65G 43/00* (2006.01)
*B65G 23/44* (2006.01)

(52) U.S. Cl.
CPC .............. *A41H 43/02* (2013.01); *B65G 15/50* (2013.01); *B65G 23/16* (2013.01); *B65G 23/44* (2013.01); *B65G 43/00* (2013.01); *B65G 2201/0229* (2013.01)

(58) Field of Classification Search
CPC ........ B65G 23/16; B65G 23/44; B65G 43/00; B65G 15/50; B65G 2201/0229; B65G 17/345; A41H 43/02; A41H 43/0242
See application file for complete search history.

(56) References Cited

U.S. PATENT DOCUMENTS

| 4,130,193 A * | 12/1978 | Bourgeois | .......... B65G 47/8823 198/457.03 |
| 2005/0109590 A1 * | 5/2005 | Shen | ...................... B25B 11/002 269/900 |
| 2017/0333952 A1 * | 11/2017 | Hartmann | .............. B07C 5/3422 |

FOREIGN PATENT DOCUMENTS

| EP | 2734462 | * 3/2019 | ............. B65G 47/22 |
| KR | 20170089695 | * 8/2017 | ............. B65G 43/00 |

* cited by examiner

*Primary Examiner* — James R Bidwell

(57) ABSTRACT

A conveyor belt system having a belt in contact with an array of actuators that are functional to move the belt in a direction perpendicular to the plane of the belt. The belt actuators can be functional to move individually to form a desired topography of the belt. The conveyor belt system can, thereby, move a workpiece in three dimensions for improved manufacturing and/or warehousing.

15 Claims, 9 Drawing Sheets

US 11,666,109 B1

CONVEYOR WITH CONFIGURABLE THREE-DIMENSIONAL TOPOGRAPHY

FIELD OF THE INVENTION

The present invention relates to a conveyor system and more particularly to a conveyor belt having a changeable three-dimensional topography.

BACKGROUND

Warehouses and manufacturing facilities have employed conveyance systems such as conveyor belts for many years to move workpieces to and between stations such as a workshop floor. Such conveyor belts move items in one dimension on a flat, planar surface having limited utility in a manufacturing or warehouse environment and often requiring further, time consuming manipulation of workpieces by a human operator.

Other conveyance devices have also been available which utilize rotatable rollers which in some circumstances have been constructed to move an object in two dimensions. However, such conveyance device can only move such workpieces on a planar surface that cannot be changed or reconfigured and can only move the device in two dimensions.

SUMMARY

The disclosed embodiments provide a conveyance device that includes a belt having a surface defining an x-y plane, a drive mechanism connected with the belt and functional to move the belt in a first direction, and an array of or a plurality of actuators connected with the belt. The array of actuators includes a plurality of actuators each being functional to move the belt in a z dimension that is substantially perpendicular to the x-y plane.

In one embodiment, the actuators can be connected with a control system that can be functional to independently operate individual actuators to form a desired topography.

In one embodiment, the control system can be in wired or wireless communication with a computer system that can be functional to provide topography data to the control system.

In one embodiment, the belt can comprise a plurality of belt strips configured to move independently of one another in the z dimension. Each belt strip can be connected with a row of actuators. In one embodiment, the belt strips can extend in the first direction.

In one embodiment, the belt has a length along the first direction and a width perpendicular to the length. The width and length can define a belt plane, and the actuators can be functional to move the belt in a direction perpendicular to the belt plane.

In one embodiment, the array of actuators can be a first array of actuators and the conveyance device further can further include a second array of actuators located opposite the first array of actuators.

In one embodiment, the conveyance device can further include a control system configured to control the second set of actuators to maintain a desired belt tension. In one embodiment, each actuator of the array of actuators can be in sliding engagement with the belt so that the actuators can either push the belt upward or pull the belt downward.

The disclosed embodiments also provide a system for conveying a workpiece that includes a belt having a surface defining a belt plane, a drive mechanism for moving the belt and an array of actuators configured to move the belt in a direction perpendicular to the belt plane.

In one embodiment, the system can further include a control system for controlling movement of the actuators of the array of actuators. The control system can be configured to receive data from a computer system regarding a desired topography to be formed by the array of actuators. The control system can be operable to control individual actuators of the array in order to form the desired topography.

In one embodiment, the array of actuators can be a first array of actuators and the system can further include a second array of actuators that are configured to adjust belt tension. The second array of actuators can be located opposite the first array of actuators. For example, the first array of actuators can be an upper array of actuators and the second array of actuators can be a lower array of actuators.

In one embodiment, the belt can be configured as a plurality of belt strips that can be configured to move relative to one another in a direction perpendicular to the belt plane. In one embodiment, each belt strip can be in contact with a row of the array of actuators.

These and other features and advantages will be apparent to one of skill in the art upon reading the following detailed description of the embodiments in conjunction with the figures. In the figures, like reference numerals used in more than one figure indicate a like element and may be considered in light of the description of the like element presented in any of the other figures having the like elements.

BRIEF DESCRIPTION OF THE DRAWINGS

For a fuller understanding of the nature and advantages of this invention, as well as the preferred mode of use, reference should be made to the following detailed description read in conjunction with the accompanying drawings. The drawings are not presented to scale unless specified otherwise on an individual basis.

DETAILED DESCRIPTION

The following description includes the best embodiments presently contemplated for carrying out the invention. This description is made for the purpose of illustrating the general principles of this invention and is not meant to limit the inventive concepts claimed herein in any way.

Figure 1:
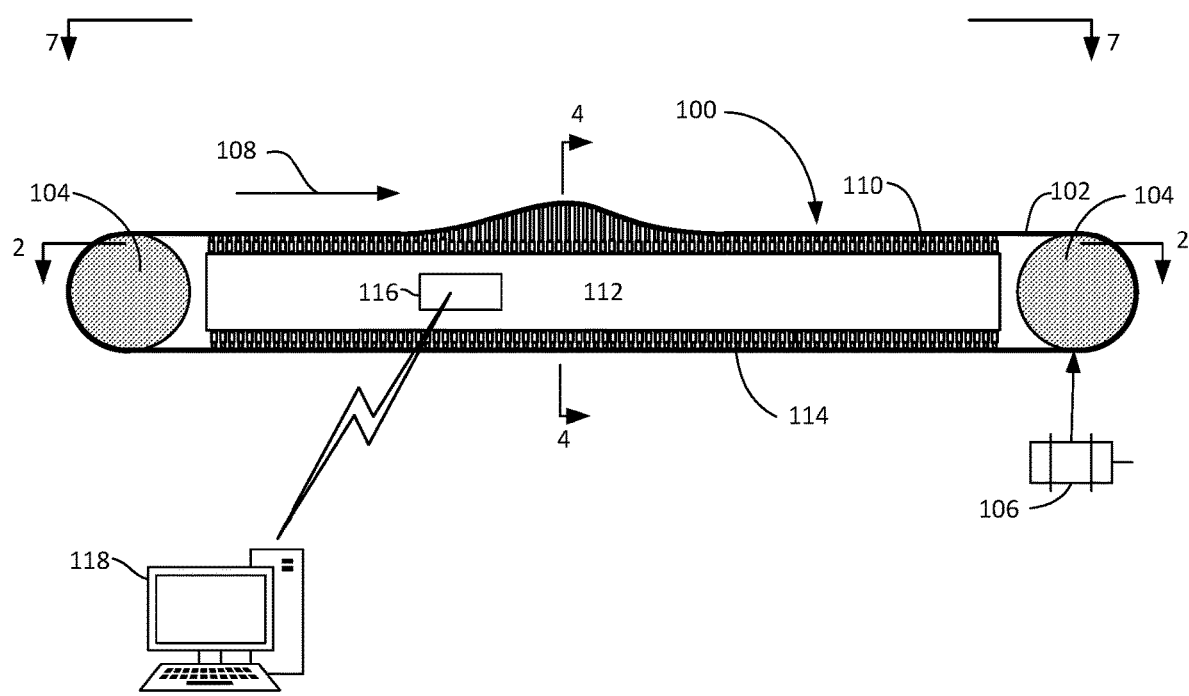
FIG. 1 shows a side view of a conveyor belt according to an embodiment.

FIG. 1 is a side view of a conveyor system 100 according to an embodiment. The conveyor system can be configured as a conveyor belt system having a belt 102 which can be driven by a drive mechanism 104 that can include one or more rollers, gears, etc. and which may be driven by a motor represented schematically as motor mechanism 106. The drive mechanism 104 and motor 106 can be operable to move the belt, as indicated by arrow 108. In some embodiments, the belt 102 can be any number of belt types. For example, the belt 102 can be a continuous layer of flexible material or could comprise a series of belt strips as will be described herein below. In some embodiments, the belt 102 may be constructed as a chain link, which could be constructed of any material, and which could be connected by hooks or other such components.

Figure 2:
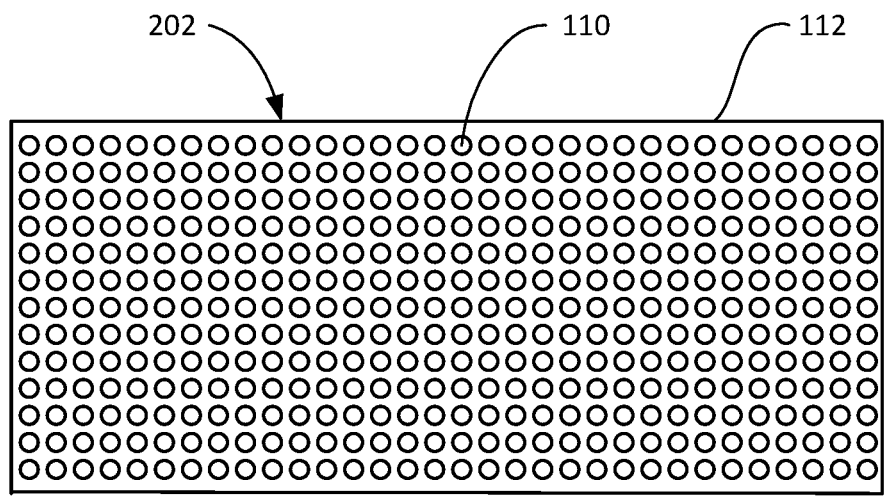
FIG. 2 is a top-down, cross-sectional view as seen from line 2-2 of FIG. 1.
Figure 3:
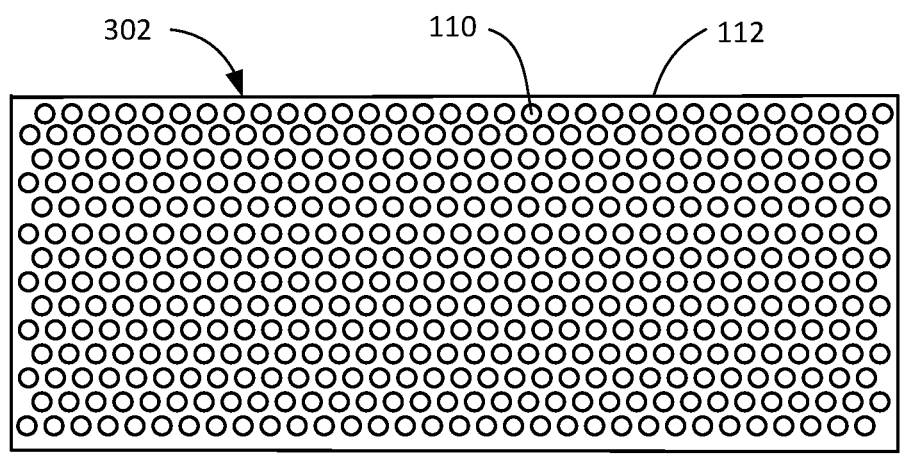
FIG. 3 is a top-down, cross sectional view according to an alternate embodiment.
Figure 7:
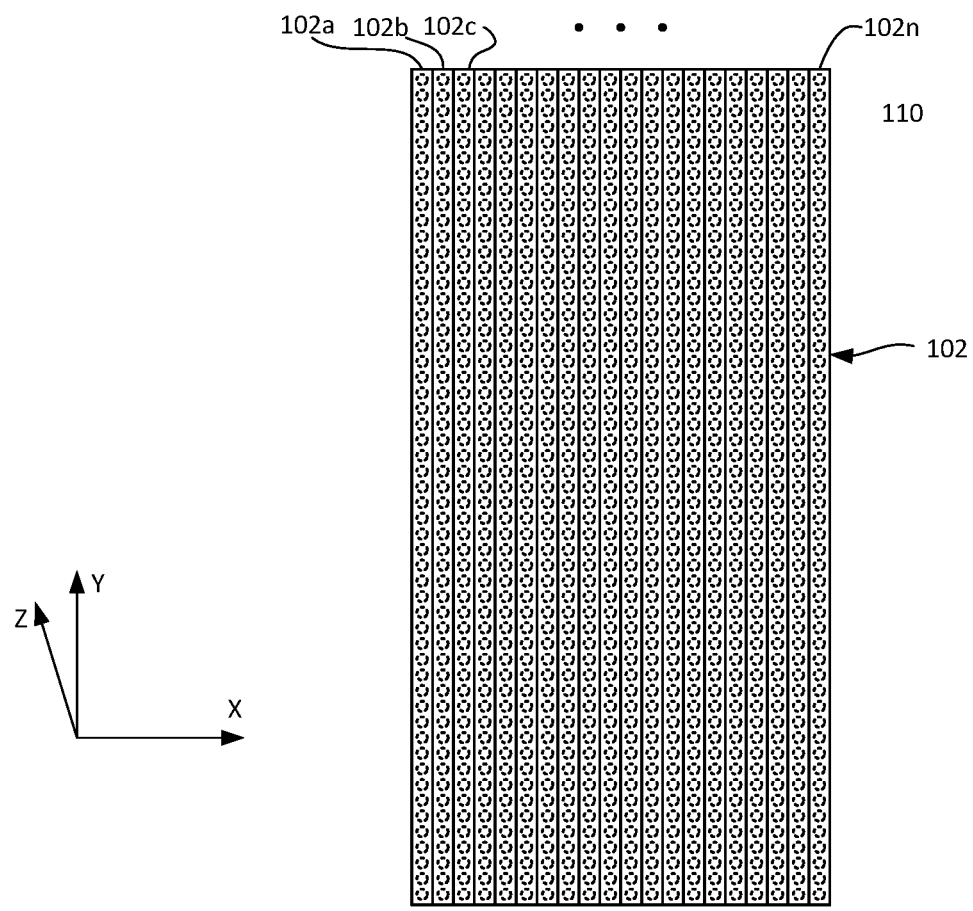
FIG. 7 is a top-down view as seen from line 7-7 of FIG. 1.

An array of actuators 110 is provided beneath the upper portion of the belt 102 in such a manner as to allow the belt 102 to slide past the actuators. In one embodiment, the actuators may be formed on or supported by a support structure 112. The support structure 112 may include mechanisms (not shown) for driving the actuators 110. Such mechanisms can include, but are not limited to electrical or electronic circuitry, pneumatic mechanism, mechanical drive mechanism, etc. In some embodiments, the belt 102 of the conveyor belt system 100 may be comprised of a plurality of narrower belts 102a, 102b . . . 102n, (as shown in FIG. 7), each narrower belt having a width at least wide enough to engage with the actuators within one column of actuators along the conveyor belt length, aka y-axis. This configuration allows for independent movement of each narrow belt in positive or negative z-direction. FIG. 2 shows a top-down cross-sectional view as seen from line 2-2 of FIG. 1. In FIG. 2 it can be seen that the actuators 110 are arranged in an array 202. This array 202 can extend substantially to the width of the belt 102 (FIG. 1). The embodiment illustrated in FIG. 2 shows the actuators arranged in rows and columns that are aligned with one another. This is, however, by way of example as the actuators 110 can be arranged in any number of array configurations. For example, as shown in FIG. 3, the actuators 110 can be arranged in an array 302 configured in rows and columns that are offset or staggered relative to adjacent rows or columns. In this embodiment a greater number of actuators 110 can be fit into a given area.

With reference to FIG. 1, the conveyance system 100 can also include control system 116, which can include circuitry operable to individually and independently control actuation of each actuator 110 of the array 202, 302 (FIGS. 2, 3). The control system 116 can be configured for wired or wireless communication with a computer system 118, laptop computer, PDA, cell phone or other electrical computer device. The computer system 118 can provide data regarding a desired topography, and the control system 116 can be functional to interpret this data to individually control the actuators 110 as needed to form the desired topography.

Figure 4:
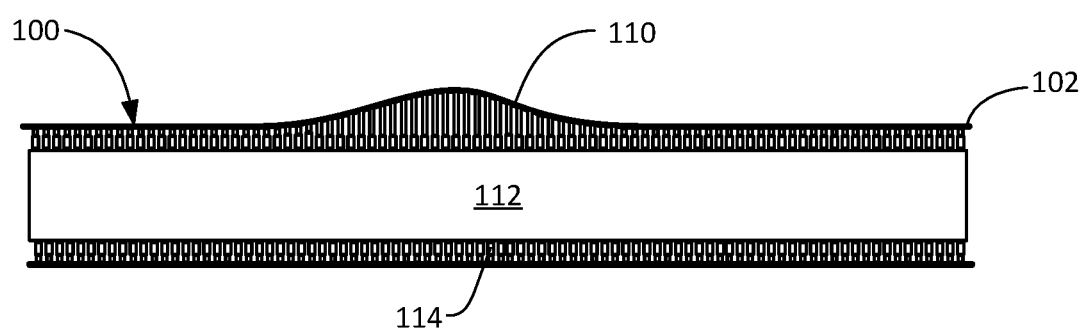
FIG. 4 is a cross-sectional view as seen from line 4-4 of FIG. 1.

FIG. 4 shows a cross-sectional end view as seen from line 4-4 of FIG. 1. With reference to FIGS. 1 and 4, it can be seen that a chosen selection of actuators 110 can be activated as desired to form the belt 102 into a desired topography. FIGS. 1 and 4 show the actuators 110 forming the belt 102 into a bump or hill shape. This is, however, by way of example as any number of topography shapes can be formed by selective actuation of the chosen actuators 110.

Figure 5:
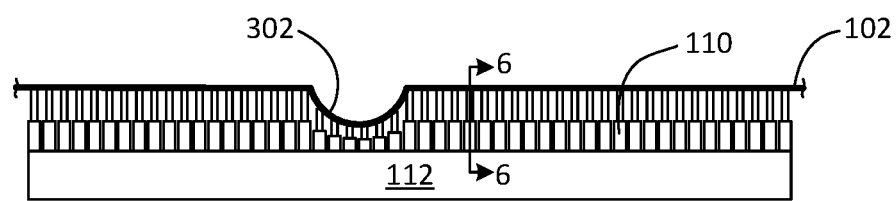
FIG. 5 is a cross-sectional view according to an alternate implementation.
Figure 6:
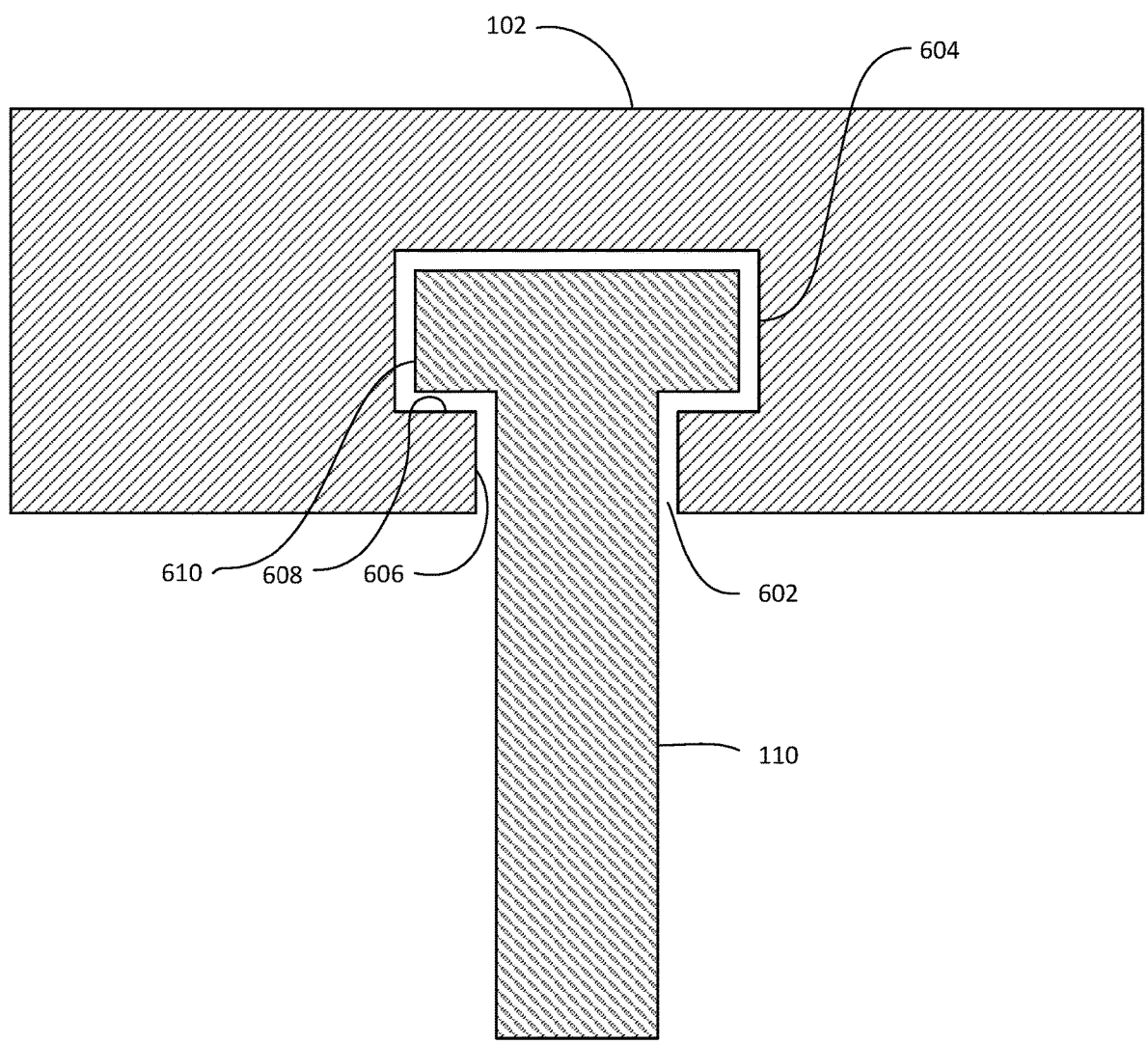
FIG. 6 is an enlarged, cross-sectional view as seen from line 6-6 of FIG. 5.

For example, as shown in FIG. 5, selected actuators 110 can be activated as desired to form a recess 302 in the belt 102. In order for the actuators 110 to pull the belt downward as shown in FIG. 5, the actuators can be connected with the belt 110 in a manner that allows the belt 102 to slide across the actuators 110, while still allowing the actuators 110 to pull the belt 102 downward. In some embodiments, the actuators 110 are supporting the belt 102 and once they are actuated into a lower height position, the belt 110 may follow the movement of the actuators under the force of gravity. FIG. 6 shows an example such a sliding engagement according to one possible embodiment. FIG. 6 shows an enlarged, cross-sectional view as seen from line 6-6 of FIG. 5. The inner side of the belt 102 can be configured with a groove 602 shown in cross-section in FIG. 6 and into which the actuator can extend. The groove 602 can be configured with an inner wider portion 604 and a narrower outer portion 606, thereby forming an inner lip 608. Similarly, the actuator 110 can be configured with an outward flared end 610, that can engage the lip 608 when pulling the belt 110 downward. Although the outward flared end 610 of the actuator 110 and outer flared wider portion 604 are shown as having squared 90 degree angles, other configuration could also be possible. For example, the actuator 110 could have a flared end having a shape similar to a flat head tapered screw, and the wider groove portion 604 could have a similar shape.

With reference again to FIGS. 1 and 4 it can be seen that in one embodiment, the conveyor system 100 can include an array of bottom actuators 114. These bottom actuators 114 can be useful for adjusting tension in the belt 102. In some embodiments, forming a topography at the top of the belt 102 may result in increase tension in the belt 102. Conversely, configuring the actuators 110 to form a flat belt 110 will decrease tension on the belt. In some embodiments, the belt 102 (or the set of narrower belt systems 102a, 102b, . . . 102n) may include enough slack to accommodate any deformation of the belt in the z-direction without creating undue tension in the belt or belt system 103 to The bottom actuators 114 can be configured to be in an extended position when the upper actuators 110 are not forming any topography. The bottom actuators 114 can then be retracted to a more neutral position when the upper actuators 110 form a topography on the belt 110 so as to reduce tension in the belt 110. The control system 116 can be operable to control the bottom actuators 114 to maintain a desired belt 102 tension.

FIG. 7 shows a top-down view as seen from line 7-7 of FIG. 1. FIG. 7 shows that the belt 102 can be configured as a plurality of individual belt strips 102a-n, each belt strip being able to move independently in a Z dimension perpendicular to the plane of the page in FIG. 7, where the X-Y plane is defined by the width and length dimensions of the belt 102. Each belt strip can be arranged over and associated with a row of actuators 110. In this way, each belt can move freely in a direction perpendicular to the plane of the page to form the above-described topography. This is, however, one possible exemplary embodiment for a belt 702 that can form a desired topography. In another embodiment, the belt 102 can be a continuous, single piece, but can be constructed of a material that can flex and stretch as needed. The belt 102 can have a width measured in an X direction, and a length measured in a Y dimension. The X dimension and Y dimension can define a belt plane. The actuators 110 can be functional to move the belt in a Z direction that is perpendicular to the belt plane defined by the X and Y dimensions.

The above conveyor system with a three-dimensional, changeable topography can be useful in many different manufacturing environments as well as in warehousing environments such as fulfillment centers. For example, the above-described conveyance system 100 can be useful for tilting or otherwise manipulating a workpiece to facilitate manufacturing, or attachment of workpiece articles. In addition, the conveyor system 100 can facilitate access to a workpiece by a human or automated operator such as by tilting, raising or lowering the workpiece as desired.

One manufacturing environment in which the above-described conveyor system 100 can provide particular advantage is in the manipulation and manufacture of items such as garments or other textile items such as handbags, hats or other accessories. For example, the manufacture of garments requires planar materials such as textiles, vinyl, leather, etc. to be formed into three-dimensional shapes, such as shirts, pants, etc. Traditionally, this has required tedious manipulation by a skilled human operator. For example, the connection of various garment panels could be joined using a manikin to simulate the three-dimensional shape of a human body.

Figure 8:
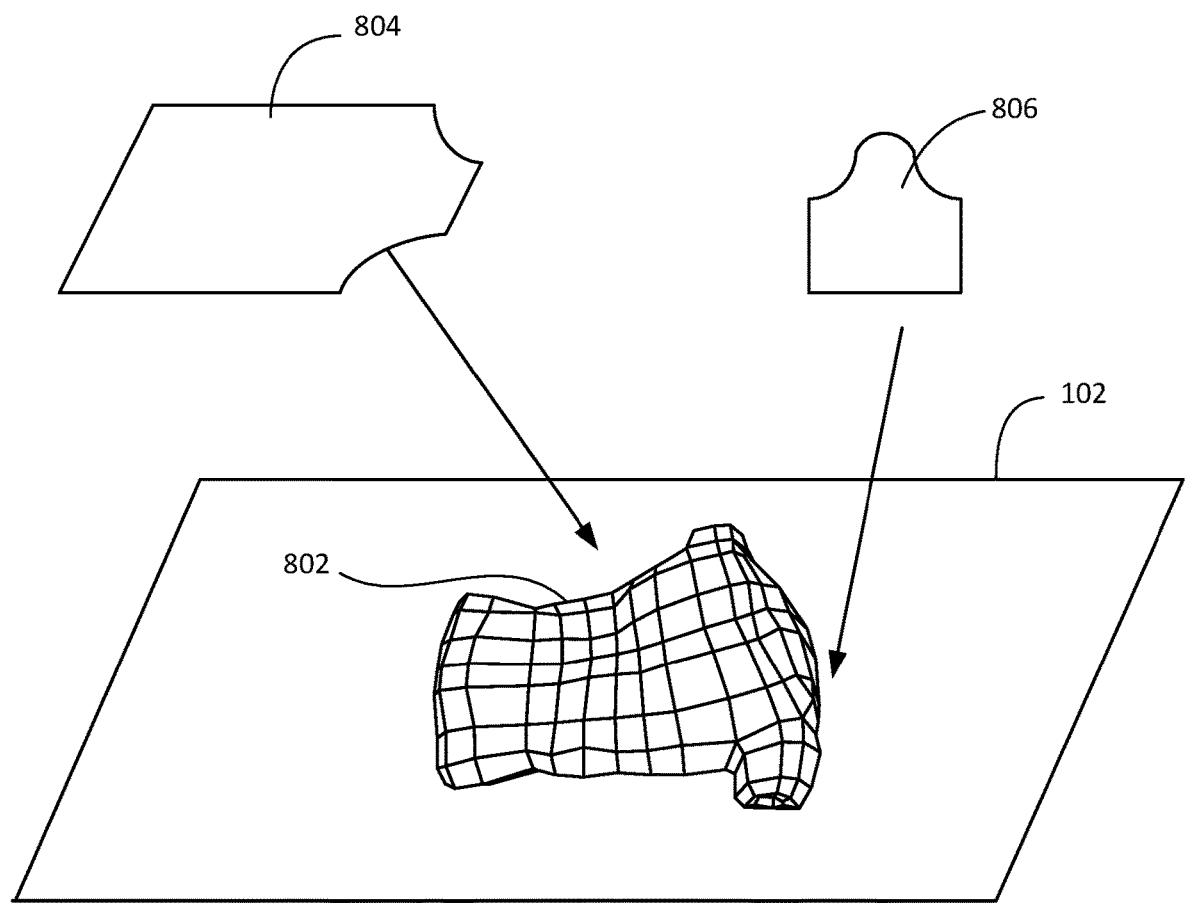
FIG. 8 is a perspective view of a conveyor belt according to an exemplary implementation.

The use of a conveyor system having a configurable, three-dimensional topography can greatly facilitate the manufacture of such garment items by providing a three-dimensional topography on which to perform such operation. One exemplary use case may be the application of the conveyor system 100 in automated garment manufacturing, and the changeable nature of the conveyor topography may accommodate some manufacturing requirements. This can be illustrated with reference to FIG. 8 which shows a belt 102 configured with a topography 802 configured to simulate a human torso including the arm hole and the sleeve area of the garment. The attachment of the sleeve to the arm hole of a garment is facilitated by causing the fabric to drape over a three-dimensional topography simulating the shoulder, the arm hole and sleeve. A first fabric panel 804 is configured to form a shirt back, such as the back of a t-shirt. A second fabric panel 806 can be configured to form a sleeve or sleeve portion. The fabric panels 804, 806 can have a preferred desired shape that is configured to be able to form a desired three-dimensional shape when sewn or otherwise connected with one another. The description of a shirt back 804 and sleeve portion 806 are merely exemplary, as any number of fabric panels can be envisioned for constructing any number of garments, accessories, etc. The first and second panels 804, 806 can be placed onto the torso simulating topography 802 before connecting the panels 804, 806, such as by sewing, or other means of attachment including adhesives, etc.

Figure 9:
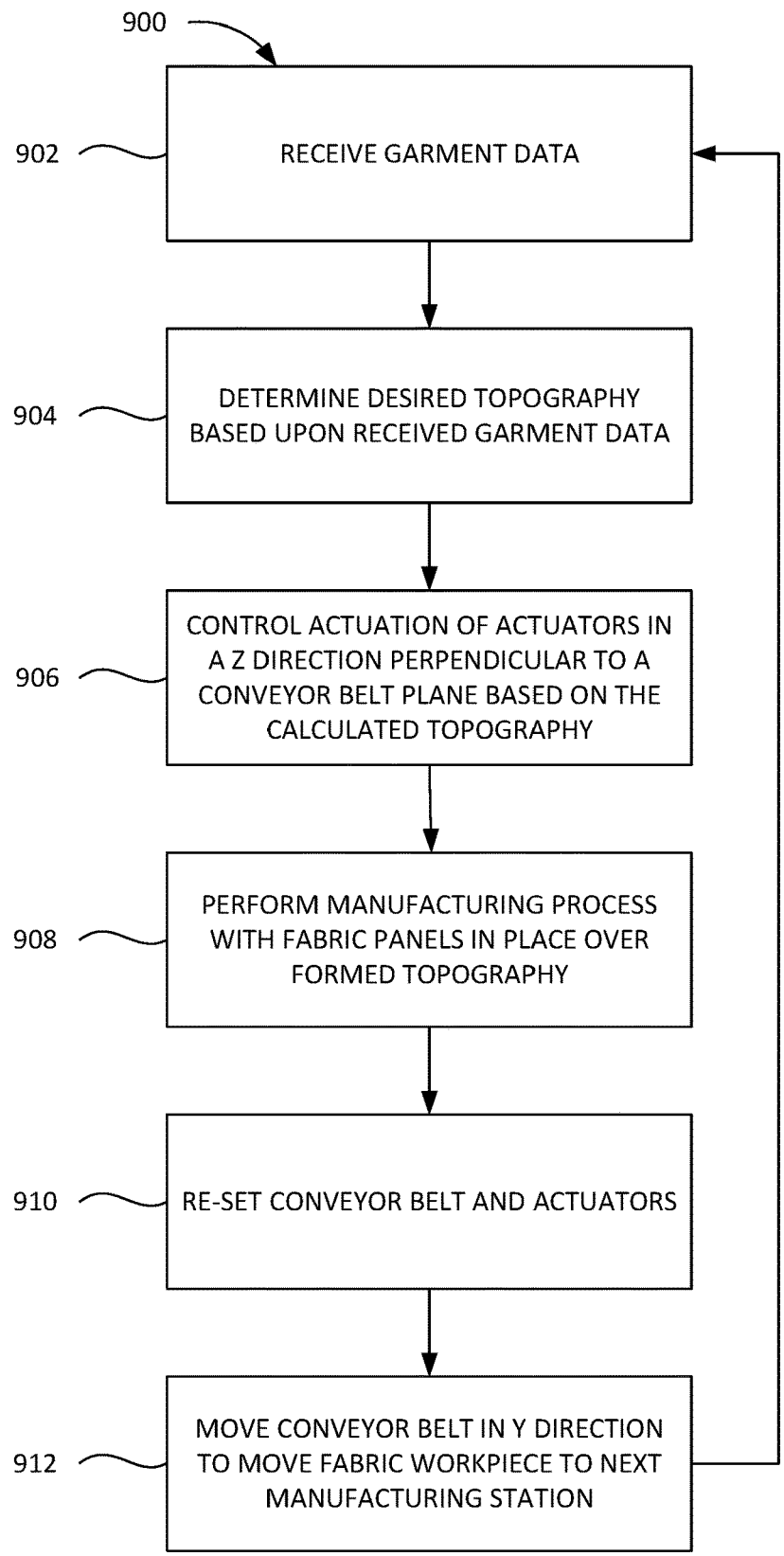
FIG. 9 is a flow chart illustrating a method for manufacturing a garment according to an embodiment.

FIG. 9 shows a flowchart illustrating a method 900 for employing a three-dimensional conveyor system in the manufacture of a garment or other similar item. A process 902 includes receiving data regarding an item to be manufactured, such as a garment. The data may include data such as size, shape, style, male, female, child, garment part such as body panel dimensions, or dimensions and shape for sleeve, sleeve-hole, pant leg, pant leg hole, as well as garment location on the conveyor belt, etc. In a step 904, a desired topography corresponding to the manufacturing operation desired is determined or selected in order to facilitate the performance of the desired manufacturing process, based on the retrieved data. This determination may include a calculation of how one or more actuators should be actuated in order to form or simulate the desired topography. In a step 906, one or more actuators are controlled to move in a Z direction oriented perpendicular to an X-Y plane defined by the conveyor belt surface. The one or more actuators are activated in such a manner as to form the desired topography. In a step 908, one or more manufacturing processes are performed with one or more fabric panels located on the desired formed topography. In a step 910, the conveyor belt is reset to a neutral, flat topography. In a step 912, the conveyor belt is moved in a Y dimension to move the workpiece to a next manufacturing station.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments but should be defined only in accordance with the following claims and their equivalents.

What is claimed is:

1. A conveyance device, comprising:
a belt extended in a first and second direction, and having a surface defining an X-Y plane;
a drive mechanism coupled to the belt and operational to move the belt in the first direction; and
an array of actuators coupled to the belt, the array of actuators comprising a plurality of actuators each being operational to move the belt in a Z direction substantially perpendicular to the X-Y plane, wherein the actuators are connected with a control system, the control system being functional to independently operate individual actuators to form a desired topography, wherein the control system is in communication with a computer system, and wherein the computer system is functional to provide topography data to the control system.

2. The conveyance system as in claim 1, wherein the belt comprises a plurality of belt strips configured to move independently of one another in a direction substantially parallel with the second direction.

3. The conveyance system as in claim 2, wherein each belt strip is connected with a row of actuators.

4. The conveyance system as in claim 2 wherein each belt strip extends in the first direction.

5. The conveyance system as in claim 1, wherein the belt has a length along the first direction and a width perpendicular to the length and wherein the width and length define a belt plane, and wherein the actuators are functional to move the belt in a direction perpendicular to the belt plane.

6. The conveyance system as in claim 1, wherein the array of actuators is a first array of actuators, and further comprising a second array of actuators located opposite the first array of actuators.

7. The conveyance system as in claim 6, further comprising a control system configured to control the second set of actuators to maintain a desired belt tension.

8. The conveyance system as in claim 1, wherein each actuator of the array of actuators is in sliding engagement with the belt so that the actuators can either push the belt upward or pull the belt downward.

9. A system for conveying a workpiece, comprising:
a belt, having a surface defining a belt plane;
a drive mechanism for moving the belt;
an array of actuators configured to move the belt in a direction perpendicular to the belt plane; and
a control system for controlling movement of the actuators of an array of actuators, wherein the control system is configured to receive data from a computer system regarding a desired topography to be formed by the array of actuators.

10. The system as in claim 9, wherein the control system is operable to control individual actuators of the array of actuators in order to form a desired belt topography.

11. The system as in claim 9, wherein the array of actuators is a first array of actuators and further comprising a second array of actuators configured to adjust a belt tension.

12. The system as in claim 11, wherein the second array of actuators is located opposite the first array of actuators.

13. The system as in claim 11, wherein the first set of actuators is an upper array of actuators and the second array of actuators is a lower array of actuators.

14. The system as in claim 9, wherein the belt comprises a plurality of belt strips configured to move relative to one another in a direction perpendicular to the belt plane.

15. The system as in claim 14, wherein each belt strip is in contact with a row of the array of actuators.

\* \* \* \* \*